ANTIBIOTIC AV290 AND PRODUCTION THEREOF

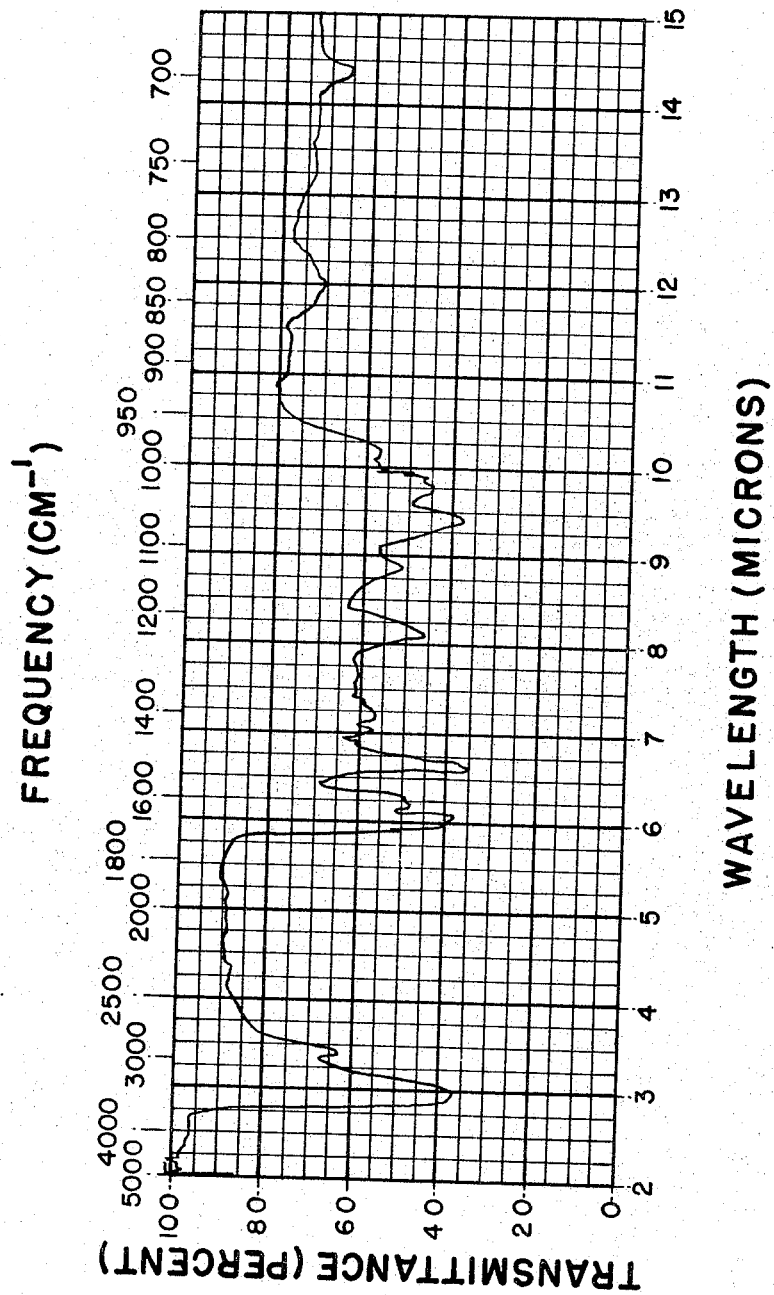

Martin P. Kunstmann, Pearl River, N.Y., and John Norman Porter, Ramsey, N.J., assignors to American Cyanamid Company, Stamford, Conn., a corporation of Maine
Filed July 29, 1966, Ser. No. 568,881
7 Claims. (Cl. 167—65)

This invention relates to a new antibiotic, to its production by fermentation, to methods for its recovery and concentration from crude solutions, and to processes for its purification and to methods for the preparation of salts and derivatives thereof.

The present invention includes within its scope the antibiotic in dilute forms, as crude concentrates, and in pure forms. These novel products are active against a variety of microorganisms including gram-positive and gram-negative bacteria. The effects of the new antibiotic on specific microorganisms, together with its chemical and physical properties, differentiate it from previously described antibiotics.

The new antibiotic, which we have designated AV290, is formed during the cultivation under controlled conditions of a new strain of *Streptomyces candidus*. The new antibiotic-producing streptomycete was isolated from a soil sample collected in Colorado. A viable culture of the new strain of *S. candidus* has been deposited with the Culture Collection Laboratory, Northern Utilization Research and Development Division, United States Department of Agriculture, Peoria, Ill., and has been added to its permanent collection as NRRL 3218.

The following is a general description of the organism *S. candidus* NRRL 3218 based on the diagnostic characteristics observed. The underscored descriptive colors and color chip designations are taken from Jacobson et al., "Color Harmony Manual," 3rd ed. (1948).

*Amount of growth.*—Moderate to good on most media; light to very light on Czapek's solution and Asparagine Dextrose Agars.

*Aerial mycelium and/or en masse spore color.*—Aerial mycelium and spores white. Sporulation light to moderate on most media; essentially absent on Czapek's solution and Asparagine Dextrose Agars.

*Soluble pigments.*—Yellowish on most media and in light to moderate amounts. Absent on Czapek's solution, Asparagine Dextrose and Inorganic Salts-Starch Agars.

*Reverse color.*—In yellowish to light orange shades on most media.

*Miscellaneous physiological reactions.*—Nitrates not reduced to nitrites on organic nitrate broth; partial liquefaction of gelatin in 14 days; no melanin produced on peptone-iron agar. Carbon source utilization according to Pridham et al. [J. Bact., 56: 107–114 (1948)] as follows: Good utilization of d-fructose and dextrose; poor to non-utilization of adonitol, l-arabinose, dextran, i-inositol, lactose, d-mannitol, d-melezitose, d-melibiose, d-raffinose, l-rhamnose, salicin, sucrose, d-trehalose and d-xylose.

*Micromorphology.*—Spores in long, straight to flexuous chains. Spores elongate $0.9-1.4\mu \times 0.4-0.5\mu$ and smooth walled as determined by electron microscopy.

The new organism is a member of the white-spored series of streptomcycetes having straight to flexuous spore chains. When a comparison of the culture was made by means of taxonomic keys and reference specimens with other recognized members of this series, it was concluded that it most closely corresponds to the species *S. candidus* (Krassilnikov) Waksman.

A critical examination of the cultural, physiological and morphological features of the organism was made when it was grown on several media including those recommended by Pridham et al. ["A Selection of Media for Maintenance and Taxonomic Study of Streptomyces," Antibiotics Annual (1956–1957), pp. 947–953].

Detailed observations are recorded in Tables I, II, III and IV below. Underscored descriptive colors are taken from the "Color Harmony Manual."

TABLE I.—CULTURAL CHARACTERISTICS OF *STREPTOMYCES CANDIDUS* NRRL 3218

[Incubation: 14 days. Temperature: 28° C.]

| Medium | Amount of Growth | Aerial Mycelium and/or Spores | Soluble Pigment | Reverse Color | Remarks |
|---|---|---|---|---|---|
| Czapek's Solution Agar | Very light | Trace of whitish aerial mycelium and sporulation. | None | Whitish | |
| Asparagine Dextrose Agar | Light | No aerial growth or sporulation | do | Bamboo (2fb) | |
| Tomato Paste Agar | Good | Aerial mycelium yellowish-white; sporulation white, sparse. | Yellowish; moderate. | Amber (3 lc) | Colony surface finely wrinkled. Sporulation confined to marginal zones. |
| Hickey & Tresner's Agar | Moderate | Aerial mycelium and sporulation white. Sporulation light. | Yellowish; light | Lt. Wheat (2 ea) | |
| Yeast Extract Agar | Good | Aerial mycelium and sporulation white; sporulation sparse. | Yellowish; moderate. | Amber (3 lc) | Colony surface finely wrinkled. |
| Oatflake Agar | Moderate | Aerial mycelium and sporulation white. Sporulation light. | Yellowish; light | Lt. Wheat (2 ea) | |
| Carvajal's Oatmeal Agar | do | Aerial mycelium and sporulation white. Sporulation light. | do | do | |
| Tomato Paste Oatmeal Agar. | Good | Aerial myceium and sporulation white. Sporulation moderate. | Yellowish; moderate. | Amber (3 lc) | Colony surface lightly wrinkled; |
| Potato Dextrose Agar | Moderate | Aerial mycelium yellowish-white; sporulation white, sparse. | do | Topaz (3 ne) | Colony surface finely wrinkled. Sporulation confined to marginal zones. |
| Bennett's Agar | do | Aerial mycelium and sporulation white. Sporulation light. | Yellowish; light | Amber (3 lc) | Colony surface finely wrinkled. |
| Inorganic Salts-Starch Agar. | Good | Aerial mycelium and sporulation white. Sporulation moderate. | None | Lt. Wheat (2 ea) | Colonies spreading. |

TABLE II.—MICROMORPHOLOGY OF *STREPTOMYCES CANDIDUS* NRRL 3218

| Medium | Aerial Mycelium and/or Sporiferous Structures | Spore Shape | Spore Size | Spore Surface |
|---|---|---|---|---|
| Inorganic Salts-Starch Agar. | Spores in long straight to flexuous chains. | Elongate to elliptical | $0.9-14.\mu \times 0.4-0.5\mu$ | Smooth as determined by electron microscopy. |

TABLE III.—MISCELLANEOUS PHYSIOLOGICAL REACTION OF *STREPTOMYCES CANDIDUS* NRRL 3218

[Temperature: 28° C.]

| Medium | Incubation Period | Amount of Growth | Physiological Reaction |
|---|---|---|---|
| Organic Nitrate Broth | 7 days | Good | Nitrate not reduced. |
| Do | 14 days | do | Do. |
| Gelatin | 7 days | do | No liquefaction. |
| Do | 14 days | do | Partial liquefaction. |
| Peptone-Iron Agar | 24 hours | do | No chromogenicity. |

TABLE IV.—CARBON SOURCE UTILIZATION PATTERN OF *STREPTOMYCES CANDIDUS* NRRL 3218

[Incubation: 10 days. Temperature: 28° C.]

| Carbon Source | Utilization* |
|---|---|
| Adonital | 0 |
| l-arabinose | 0 |
| Dextran | 0 |
| d-Fructose | 3 |
| i-Inositol | 0 |
| Lactose | 0 |
| d-Mannitol | 1 |
| d-Melezitose | 0 |
| d-Melibiose | 0 |
| d-Raffinose | 0 |
| l-rhamnose | 0 |
| Salicin | 0 |
| Sucrose | 0 |
| d-Trehalose | 1 |
| d-Xylose | 0 |
| Dextrose | 3 |
| Negative control | 0 |

* 3—Good utilization. 2—Fair utilization. 1—Poor utilization. 0—No utilization.

It is to be understood that for the production of the new antibiotic the present invention is not limited to this particular organism or to organisms fully answering the above growth and microscopic characteristics which are given for illustrative purposes. In fact, it is desired and intended to include the use of mutants produced from the described organism by various means such as X-radiation, ultraviolet radiation, nitrogen mustard, phage exposure and the like.

THE FERMENTATION PROCESS

Cultivation of the organism *S. candidus* NRRL 3218 may be carried out in a wide variety of liquid culture media. Media which are useful for the production of the novel anti-biotic include an assimilable source of carbon such as starch, sugar, molasses, glycerol, etc.; an assimilable source of nitrogen such as protein, protein hydrolystate, polypeptides, amino acids, corn steep liquor, etc.; and inorganic anions and cations, such as potassium, sodium, calcium, sulfate, phosphate, chloride, etc. Trace elements such as boron, molybdenum, copper, etc.; are supplied as impurities of other constituents of the media. Aeration in tanks and bottles is provided by forcing sterile air through or onto the surface of the fermenting medium. Further agitation in tanks is provided by a mechanical impeller. An antifoaming agent, such as 1% octadecanol in lard oil, may be added as needed.

INOCULUM PREPARATION

Shaker flask seed inoculum is prepared by inoculating 100 milliliter portions of sterile liquid medium in 500 milliliter flasks with scrapings or washings of spores from an agar slant of the culture. The following medium is ordinarily used.

| | Grams |
|---|---|
| Soybean meal | 10 |
| Glucose | 20 |
| Corn steep liquor | 5 |
| Calcium carbonate | 3 |
| Water to 1000 milliliters. | |

The flasks are incubated at a temperature from 25–29° C., preferably 28° C., and agitated vigorously on a rotary shaker for 30 to 48 hours. These 100 milliliter portions of seed inoculum are used to inoculate one liter and twelve liter batches of the same medium in 2 liter and 20 liter glass fermentors. The inoculum mash is aerated with sterile air while growth is continued for 30 to 48 hours. These batches of inocula in turn are used to inoculate tank fermentors.

TANK FERMENTATION

For the production of the antibiotic in tank fermentors the following fermentation medium is preferably used.

| | Grams |
|---|---|
| Glycerol | 30 |
| Soybean meal | 10 |
| Potassium phosphate, dibasic | 10 |
| Calcium carbonate | 10 |
| Sodium chloride | 5 |
| Potassium chloride | 0.5 |
| Magnesium sulfate | 0.5 |
| Water to 1000 milliliters. | |

Each tank is inoculated with 3 to 10% of inoculum made as described above. Aeration is supplied at the rate of 0.5–1.0 liter of sterile air per liter of broth per minute and the fermenting mixture is agitated by an impeller driven at 200–400 r.p.m. The temperature is maintained at 25–29° C., usually at 28° C. The fermentation is ordinarily continued for 120 to 160 hours, at which time the mash is harvested.

PURIFICATION PROCEDURE

After the fermentation is completed, the fermented mash containing the antibiotic is filtered, preferably at pH 6, to remove the mycelium. Diatomaceous earth or any other conventional filtration aid may be used to assist in the filtration. Normally the mycelial cake is washed with water and the wash is pooled with the filtrate. The antibiotic activity is adsorbed onto activated charcoal or other suitable charcoal adsorbant, using about 0.5% (weight/volume) of the adsorbant. Colored impurities are removed from the adsorbant by washing it with 40% aqueous acetone using about 20 ml. of wash liquid per gram of adsorbant. The antibiotic activity is retained on the charcoal. The antibiotic activity may be eluted from the charcoal by stirring it for about one-half hour with 40% aqueous acetone adjusted to pH 2 with concentrated sulfuric acid, using a volume of eluate equal to about one-quarter of the original beer volume. The eluate is concentrated under reduced pressure to an aqueous phase equal to about one-twentieth of its original volume. The pH of this phase is adjusted to about 5.5 with barium hydroxide and the barium sulfate precipitate which forms is removed by filtration. The adjusted solution (filtrate) is further concentrated to about 400–800 ml. This concentrate is then slurried with acidified alumina (using about one-fifth of the amount of alumina in grams as compared to the volume of concentrate) and this slurry is poured onto a suitable column of acidified alumina (using approximately 10 times the amount of alumina used in the charge) wet-packed with methanol. The antibiotic activity is eluted from the column with 50% aqueous methanol. The active fractions are combined and concentrated to a small volume (one liter or less) under reduced pressure. The pH of this concentrate is adjusted to about 6.0 to 6.5 with barium hydroxide. Again, the barium sulfate precipitate which forms is removed by filtration and the clear filtrate is lyophilized to yield the crude antibiotic AV290. This lyophilized material is now further purified by column chromatography on a suitable ion exchange resin, as for example, CM Sephadex C–25 (H+ form) or IRC–50 (H+ form). The column may be eluted using dilute sulfuric acid solutions.

Optically, the elution may be carried out using salt solutions. The eluate containing the antibiotic, located by ultraviolet absorption at 280 m$\mu$, is adjusted to about pH 6.3 with barium hydroxide. The precipitate which forms is removed by filtration and the filtrate concentrated to a volume of 30–80 milliliters. The concentrate is added to a larger quantity of ethanol with stirring and the precipitate which forms is recovered by centrifugation. The precipitate is washed with acetone and dried at moderate temperature under reduced pressure to yield antibiotic AV290 in the sulfate form.

A microanalytical sample is prepared by twice precipitating AV290 sulfate from aqueous acetone and drying the precipitate under high vacuum (10$^{-3}$ mm.) at 100° C. for two days.

The antibiotic sulfate prepared in this manner contains the elements carbon, hydrogen, oxygen, nitrogen, sulfur, and chlorine in substantially the following percentages by weight:

| | |
|---|---|
| Carbon | 52.36 |
| Hydrogen | 5.77 |
| Oxygen | 30.95 |
| Nitrogen | 5.70 |
| Sulfur | 0.95 |
| Chlorine | 3.00 |

The material does not have a definitive melting point. The percent of methyl groups attached to nitrogen is 0.53. Optical rotation is $[\alpha]_D^{25°} = -86°$ ($\pm 3°$) (c.=0.925 in water). Ultraviolet maxima occur at:

280 m$\mu$ ($E_{1\,cm.}^{1\%}$=43) in acidic solutions 280 m$\mu$ ($E_{1\,cm.}^{1\%}$=49.5) in neutral solutions 300 m$\mu$ ($E_{1\,cm.}^{1\%}$=55) in basic solutions An infrared absorption spectrum of AV290 sulfate in a KBr pellet, prepared in a standard manner, exhibits characteristic absorption at the following wavelengths expressed in microns: 2.98, 3.45, 6.02, 6.23, 6.31, 6.66, 6.90, 7.05, 7.23, 8.15, 8.88, 9.44, 9.75, 9.88, 10.20, 11.95, 14.40.

The sulfate salt may be converted into the base by dissolving one gram of the sulfate in 50 ml. of water giving a solution of pH 6.3. This is passed through a column consisting of a mixture of 5 ml. each of IR 45 (OH–) and IR 20 (H+) and washed through with an additional 150 ml. of water. The total eluant, pH 7.6, is concentrated to a small volume and the antibiotic base precipitates upon the addition of ethanol. After filtration and washing with acetone, 845 mg. of free base is obtained.

A microanalytical sample of the free base is prepared by precipitating the antibiotic base from aqueous ethanol, methanolic ethanol, and aqueous acetone and drying the precipitate under high vacuum (10$^{-3}$ mm.) at 100° C. for two days.

The antibiotic base prepared in this manner contains the elements carbon, hydrogen, oxygen, nitrogen, and chlorine in substantially the following percentages by weight:

| | |
|---|---|
| Carbon | 53.11 |
| Hydrogen | 6.04 |
| Oxygen | 30.04 |
| Nitrogen | 6.12 |
| Chlorine | 3.34 |

The percent of methyl groups attached to nitrogen is 0.60. Optical rotation is $[\alpha]_D^{25°} = -95°$ ($\pm 3.8°$) (c.=0.780 in water). Ultraviolet maxima occur at:

280 m$\mu$ ($E_{1\,cm.}^{1\%}$=44) in acidic solutions 280 m$\mu$ ($E_{1\,cm.}^{1\%}$=48.5) in neutral solutions 300 m$\mu$ ($E_{1\,cm.}^{1\%}$=55.5) in basic solutions An infrared absorption spectrum of AV290 free base in a KBr pellet, prepared in a standard manner, exhibits characteristic absorption at the following wavelengths expressed in microns: 2.98, 3.43, 6.04, 6.22, 6.30, 6.65, 6.85, 7.02, 7.21, 8.12, 8.88, 9.43, 9.75, 9.88, 10.17, 12.00, 14.40. The infrared curve is shown in the accompanying drawing.

AV290 shows the following $R_f$ values in the solvent systems indicated below using *Bacillus subtilis* pH 6.0 or *Corynebacterium xerosis* as detection organisms:

| Rf value: | Solvent system* |
|---|---|
| 0.54 | Methanol 4 parts, 1.5% aqueous NaCl 1 part. |
| 0.75 | 5% aqueous NH$_4$Cl. |

*The strips were buffered with a solution containing 0.95 M sodium sulfate and 0.05 M sodium bisulfate.

Both antibiotic AV290 base and sulfate are soluble in water and dimethylsulfoxide. Neither is soluble in the common organic solvents with the exception that the antibiotic base is moderately soluble in methanol.

The acid hydrolysis product of antibiotic AV290 and which, in itself, has useful antibacterial properties is prepared as described in Example 4 below.

Antibiotic AV290 is clearly distinguished from other antibiotics by the characterization data given above and by its antimicrobial activity. The in vitro antimicrobial activity of this new antibiotic and its hydrolysis product is presented in the table below which shows the minimal inhibitory concentration required to inhibit the growth of representative microorganisms in a nutrient medium.

TABLE V

| | Minimal Inhibitory Concentrations (micrograms per ml.) | |
|---|---|---|
| | Antibiotic AV290 | Hydrolysis Product |
| *Staphylococcus aureus* ATCC 6538P | 6.2 | 3.1 |
| *Staphylococcus aureus* No. 69 | 3.1 | 3.1 |
| *Staphylococcus aureus*, Rose ATCC 14154 | 12.5 | 6.2 |
| *Staphylococcus aureus*, Smith ATCC 13709 | 6.2 | 3.1 |
| *Staphylococcus aureus* 4050B-122-3 | 6.2 | |
| *Staphylococcus aureus* 4050B-122-7 | 6.2 | |
| *Staphylococcus aureus* 4050B-122-9 | 6.2 | |
| *Staphylococcus aureus* 4050B-122-11 | 12.5 | |
| *Staphylococcus aureus* 4050B-122-14 | 6.2 | |
| *Streptococcus faecalis* ATCC 8043 | 3.1 | 12.5 |
| *Streptococcus pyogenes* C 203 | 0.6 | 3.1 |
| *Streptococcus* sp. nonhemolytic No. 11 | 6.2 | 31.0 |
| *Streptococcus* sp. β hemolytic No. 80 | 3.2 | 6.2 |
| *Streptococcus pyogenes* NY-5 | 1.3 | |
| *Sarcina lutea* ATCC 9341 | 1.3 | 6.2 |
| *Bacillus subtilis* ATCC 6633 | 0.6 | 6.2 |
| *Proteus vulgaris* ATCC 9484 | 250 | >250 |
| *Escherichia coli* ATCC 9637 | >250 | >250 |
| *Mycobacterium smegmatis* ATCC 607 | >250 | 125 |
| *Corynebacterium xerosis* NRRL B 1397 | | 3.1 |
| *Bacillus cereus* ATCC 10702 | | 12.5 |
| *Klebsiella pneumoniae* ATCC 10031 | | >250 |
| *Salmonella gallinarum* Led. An. Ind. 604 | >250 | >240 |
| *Pseudomonas aeruginosa* ATCC 10145 | >250 | >250 |
| *Clostridium sporogenes* ATCC 7955 | 0.6 | |

The new antibiotic is active against a variety of gram-positive microorganism such as staphylococci, streptococci and diplococci. The new antibiotic is thus potentially useful as a therapeutic agent in treating bacterial infections in animals caused by such microorganisms. The new antibiotic can be expected to be usefully employed for controlling such infections by topical application or parenteral administration.

The usefulness of antibiotic AV290 is demonstrated by its ability to control systemic lethal infections in mice. The new antibiotic shows high in vivo antibacterial activity in mice against *Staphylococcus aureus,* strain Smith and *Staphylococcus aureus* strain Rose, *Streptococcus pyogenes,* C-203, *Escherichia coli* and *Diplococcus pneumoniae,* SVI, when administered by a single subcutaneous dose to groups of Carworth Farms CF1 female mice, weight about 20 grams, infected intraperitoneally with a lethal dose of these bacteria in trypticase soy broth (TSP) dilutions of a five-hour TSP blood culture. The numbers in parentheses directly after the name of a particular organism in the table below indicate the dilutions of these bacteria.

Table VI below shows the in vivo antibacterial activity of antibiotic AV290 and its hydrolysis product.

TABLE VI.—IN VIVO ANTIBACTERIAL ACTIVITY OF AV290 ANTIBIOTIC AND ITS HYDROLYSIS PRODUCT

| Test System | Dosage [1] (mg./kg. of body wt.) | Survivors/Total [2] | |
|---|---|---|---|
| | | AV290 Antibiotic | Hydrolysis Product |
| *Staphylococcus aureus* Smith Strain ($10^{-2}$) | 320 | 5/5 | |
| | 160 | 5/5 | |
| | 80 | 5/5 | |
| | 40 | 5/5 | |
| | 20 | 25/25 | 9/10 |
| | 10 | 21/25 | 5/10 |
| | 5 | 9/20 | 0/10 |
| | 2.5 | 3/20 | 0/10 |
| | 1.25 | 1/20 | 0/10 |
| | 0.63 | 0/10 | 0/10 |
| *Staphylococcus aureus* Strain Rose ($10^{0}$) | 320 | 5/5 | |
| | 80 | 1/5 | |
| | 20 | 0/5 | |
| | 5 | 0/5 | |
| *Streptococcus pyogenes* C-203 ($10^{-5}$) | 320 | 5/5 | |
| | 80 | 5/5 | |
| | 20 | 5/5 | |
| | 5 | 5/4 | |
| | 1.25 | 1/5 | |
| *Escherichia coli* 311 ($10^{-3}$) | 320 | 9/15 | |
| | 160 | 1/5 | |
| | 80 | 0/5 | |
| *Diplococcus pneumoniae* SVI ($10^{-6}$) | 320 | 5/5 | |
| | 80 | 5/5 | |

[1] The antibiotic was administered in a single subcutaneous dose.
[2] No. of surviving mice/no. of treated mice, 5–6 days postinfection. In controls, all infected, non-treated mice died.

The invention will be described in greater detail in conjunction with the following specific examples.

Example 1.—Inoculum Preparation

A typical medium used to grow the primary inoculum is prepared according to the following formula:

| | Grams |
|---|---|
| Soybean meal | 10 |
| Glucose | 20 |
| Corn steep liquor | 5 |
| Calcium carbonate | 3 |

Water to 1000 milliliters.

The washed or scraped spores from an agar slant of *S. candidus* NRRL 3218 are used to inoculate two 500 ml. flasks containing 100 milliliters each of the above medium. The flasks are placed on a rotary shaker and agitated vigorously for 48 hours, at 28° C. The resulting flask inoculum is transferred to a 5 gallon glass fermentor containing 12 liters of sterile medium. The glass fermentor is aerated with sterile air while growth is carried out for about 48 hours, after which the contents are used to seed a 300 liter tank fermentor.

Example 2.—Fermentation

A fermentation medium is prepared according to the following formula:

| | Grams |
|---|---|
| Glycerol | 30 |
| Soybean meal | 10 |
| Potassium phosphate, dibasic | 10 |
| Calcium carbonate | 10 |
| Sodium chloride | 5 |
| Potassium chloride | 0.5 |
| Magnesium sulfate | 0.5 |

Water to 1000 milliliters.

The fermentation medium is sterilized at 120° C. with steam at 15 pounds pressure for 45–60 minutes. The pH of the medium after sterilization is 7.5. Three hundred liters of sterile medium in a 400 liter tank fermentor are inoculated with 12 liters of inoculum prepared as described in Example 1, and the fermentation carried out at 28° C. using Hodag LG–8 oil as a defoaming agent. Aeration is supplied at the rate of 0.5 liter of sterile air per liter of mash per minute. The mash is agitated by an impeller driven at 200 revolutions per minute. At the end of approximately 155 hours of fermentation time, the mash is harvested.

Example 3.—Isolation and purification

Two hundred sixty liters of fermented mash are adjusted to pH 6.0 with concentrated sulfuric acid. About 3% w./v. of diatomaceous earth is added and the mixture is filtered. The mycelial pad is washed with about 30 liters of water and then discarded. The pooled filtrate and water wash is stirred for 30 minutes with 1375 g. of Darco G–60. Hyflo (1% w./v.) is added and the mixture filtered. The Darco pad is washed with about 30 liters of water and the wash and filtrate are both discarded. The Darco pad is stirred for 10 minutes with 27.5 liters of 40% aqueous acetone, which is removed by filtration and discarded. The Darco pad is then stirred for 10 minutes with 70 liters of 40% aqueous acetone, preadjusted to pH 2.0 with concentrated sulfuric acid. This suspension is filtered and the filtrate is concentrated to 4.0 liters. The concentrate is adjusted to pH 5.2 using powdered barium hydroxide and the precipitated barium sulfate is removed by filtration with the aid of Hyflo. The filtrate is further concentrated to 500 ml. This concentrate is slurried with 100 g. of acid-treated alumina and poured onto a column consisting of 1 kg. acid-treated alumina in methanol. The acid-treated alumina is prepared by acidifying an aqueous slurry of Merck alumina with concentrated sulfuric acid until a constant pH of 3.0 is obtained, filtering, washing with water and methanol, and air drying. The column is then eluted with 2.0 liters of methanol followed by 60.0 liters of 50% aqueous methanol. The 50% aqueous methanol eluate is concentrated to 700 ml. and the pH is adjusted to 6.3 with barium hydroxide. The barium sulfate is removed by filtration with the aid of Hyflo and the filtrate is lyophilized to give 36.4 g. of purified AV290 antibiotic activity.

Ten grams of the lyophilized residue from the alumina column are dissolved in 30 ml. of water and the pH of this solution is adjusted to 6.0 with dilute sulfuric acid. This is added to a column consisting of 250 g. of CM Sephadex C-25 (H+ form) and the column is eluted with a linear gradient between 4.0 liters of water adjusted to pH 6.0 with dilute sulfuric acid and 4.0 liters of water adjusted to pH 1.0 with concentrated sulfuric acid. The antibiotic activity is located in the eluant using ultraviolet absorption at 280 mµ. The portion of the eluant containing the antibiotic activity is adjusted to pH 6.3 with barium hydroxide. The barium sulfate is removed by filtration with the aid of Hyflo and the filtrate concentrated to 50 ml. This is added, with stirring, to 500 ml. of ethanol, forming a precipitate. The suspension is centrifuged and the precipitate washed with acetone and dried at 58° C. under reduced pressure to give 7.25 g. of AV290 antibiotic in the sulfate form.

A microanalytical sample is prepared by twice precipitating AV290 sulfate from aqueous acetone and drying the precipitate under high vacuum ($10^{-3}$ mm.) at 100° C. for two days.

The chemical analysis of this product and its other chemical, physical and biological properties have already been described.

*Example 4.—Acid hydrolysis product of antibiotic AV290*

One gram of AV290 antibiotic base is dissolved in 7.5 ml. of boiling water. To this is added 1.25 ml. of 4 N HCl and the resulting solution boiled an additional 2–3 minutes. An additional 3.5 ml. of 4 N HCl is added and the solution cooled whereupon a precipitate forms. This is filtered, washed with 2 ml. of 2 N HCl and air dried. This precipitate is dissolved in 10 ml. of water and concentrated to a residue and the process repeated twice more. The residue is then dissolved in methanol, and acetone is added to precipitate the hydrolysis product. Upon filtration, 674 mg. of precipitate is obtained.

An analytical sample is prepared by reprecipitating the hydrolysis product from methanolic acetone and drying the precipitate under high vacuum ($10^{-3}$ mm.) at 100° C. for one day.

AV290 antibiotic hydrolysis product prepared in this manner contains the elements carbon, hydrogen, oxygen, nitrogen, and chlorine in substantially the following percentages by weight:

| | Percent |
|---|---|
| Carbon | 54.07 |
| Hydrogen | 5.13 |
| Oxygen | 26.70 |
| Nitrogen | 6.29 |
| Chlorine | 7.82 |

The percent of methyl groups attached to nitrogen is 0.74%. Optical rotation is $[\alpha]_D^{25} = -60.4°(\pm 2.9°)$ (c.=1.043 in water). Ultraviolet maxima occur at:

279 mµ ($E_{1cm}^{1\%}$=57) in acidic solutions 281 mµ ($E_{1cm}^{1\%}$=62.5) in neutral solutions 295 mµ ($E_{1cm}^{1\%}$=117) in basic solutions An infrared absorption spectrum of the hydrolysis product in a KBr pellet, prepared in a standard manner, exhibits characteristic absorption at the following wavelengths expressed in microns: 2.99, 3.43, 6.02, 6.20, 6.25, 6.63, 6.85, 7.00, 7.37, 7.95, 8.15, 8.28, 8.50, 8.85, 9.45, 9.88, 10.10, 11.35, 11.99, 13.30, 14.40.

We claim:

1. A substance from the group consisting of antibiotic AV290, which in its free base form is characterized as follows:

| Analysis: | Percent |
|---|---|
| Carbon | 53.11 |
| Hydrogen | 6.04 |
| Oxygen | 30.04 |
| Nitrogen | 6.12 |
| Chlorine | 3.34 |

Optical rotation: $[\alpha]_D^{25} = -95°(\pm 3.8°)$ (c.=0.780 in water)

Ultraviolet maxima:

280 mµ ($E_{1cm}^{1\%}$=44) in acidic solutions 280 mµ ($E_{1cm}^{1\%}$=48.5) in neutral solutions 300 mµ ($E_{1cm}^{1\%}$=55.5) in basic solutions Infrared spectrum: as shown in the drawing, and salts thereof.

2. A substance antibiotic AV290 which in its free base form is characterized as follows:

| Analysis: | Percent |
|---|---|
| Carbon | 53.11 |
| Hydrogen | 6.04 |
| Oxygen | 30.04 |
| Nitrogen | 6.12 |
| Chlorine | 3.34 |

Optical rotation: $[\alpha]_D^{25} = -95°(\pm 3.8°)$ (c.=0.780 in water)

Ultraviolet maxima:

280 mµ ($E_{1cm}^{1\%}$=44) in acidic solutions 280 mµ ($E_{1cm}^{1\%}$=48.5) in neutral solutions 300 mµ ($E_{1cm}^{1\%}$=55.5) in basic solutions Infrared spectrum: as shown in the drawing 3. The acid hydrolysis product of antibiotic AV290 characterized as follows:

| Analysis: | Percent |
|---|---|
| Carbon | 54.07 |
| Hydrogen | 5.13 |
| Oxygen | 26.70 |
| Nitrogen | 6.29 |
| Chlorine | 7.82 |

Optical rotation: $[\alpha]_D^{25} = -60.4°(\pm 2.9°)$ (c.=1.043 in water)

Ultraviolet maxima:

279 mµ ($E_{1cm}^{1\%}$=57) in acidic solutions 281 mµ ($E_{1cm}^{1\%}$=62.5) in neutral solutions 295 mµ ($E_{1cm}^{1\%}$=117) in basic solutions and exhibiting characteristic absorption in the infrared region at the following wavelengths expressed in microns: 2.99, 3.43, 6.02, 6.20, 6.25, 6.63, 6.85, 7.00, 7.37, 7.95, 8.15, 8.28, 8.50, 8.85, 9.45, 9.88, 10.10, 11.35, 11.99, 13.30, 14.40.

4. A composition of matter consisting of the substance according to claim 2 in the crystalline state.

5. A therapeutic composition of matter containing as an essential antibacterial agent a compound as characterized in claim 2 and a pharmaceutical carrier.

6. A process which comprises cultivating *Streptomyces candidus* NRRL 3218 in an aqueous nutrient medium containing assimilable sources of carbohydrate, nitrogen and inorganic salts under submerged aerobic conditions until substantial antibiotic activity is imparted to said medium by the production of a compound as characterized in claim 2.

7. A process which comprises cultivating a microorganism from the group consisting of *Streptomyces candidus* NRRL 3218 in an aqueous nutrient medium containing assimilable sources of carbohydrate, nitrogen and inorganic salts under submerged aerobic conditions for a period of from 24 to 240 hours and at a temperature of from 20 to 35° C. until substantial antibiotic activity is imparted to said medium by the production of a compound as characterized in claim 2, and then recovering the antibiotic activity therefrom.

References Cited

UNITED STATES PATENTS 3,061,516  10/1962  Hooper et al. _____ 167—65
3,132,609  5/1964   Yamamoto et al. _____ 167—65
3,150,046  9/1964   Sensi et al. _____ 167—65

ALBERT T. MEYERS, *Primary Examiner.*
JULIAN S. LEVITT, *Examiner.*
J. GOLDBERG, *Assistant Examiner.*